United States Patent Office 3,583,029
Patented June 8, 1971

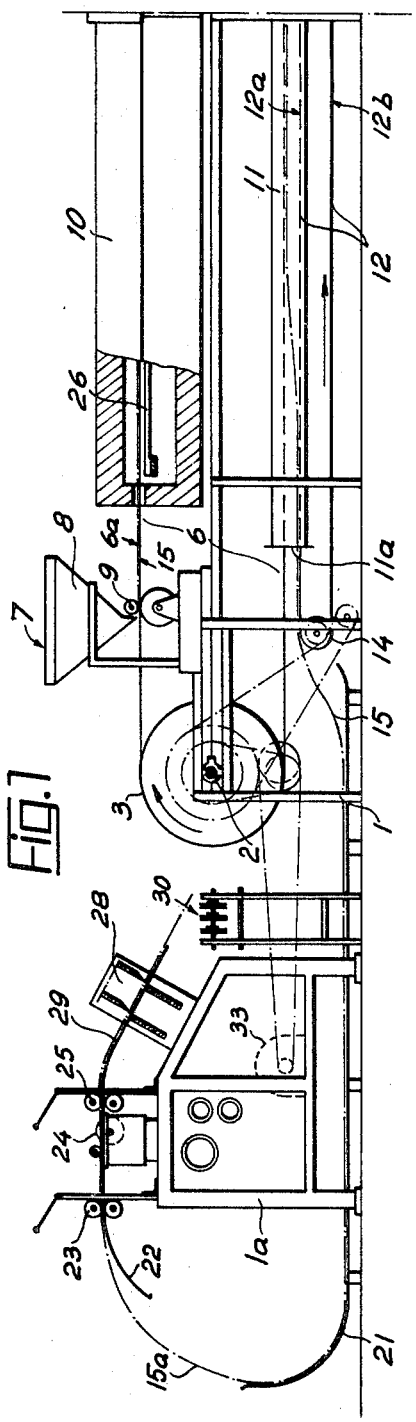
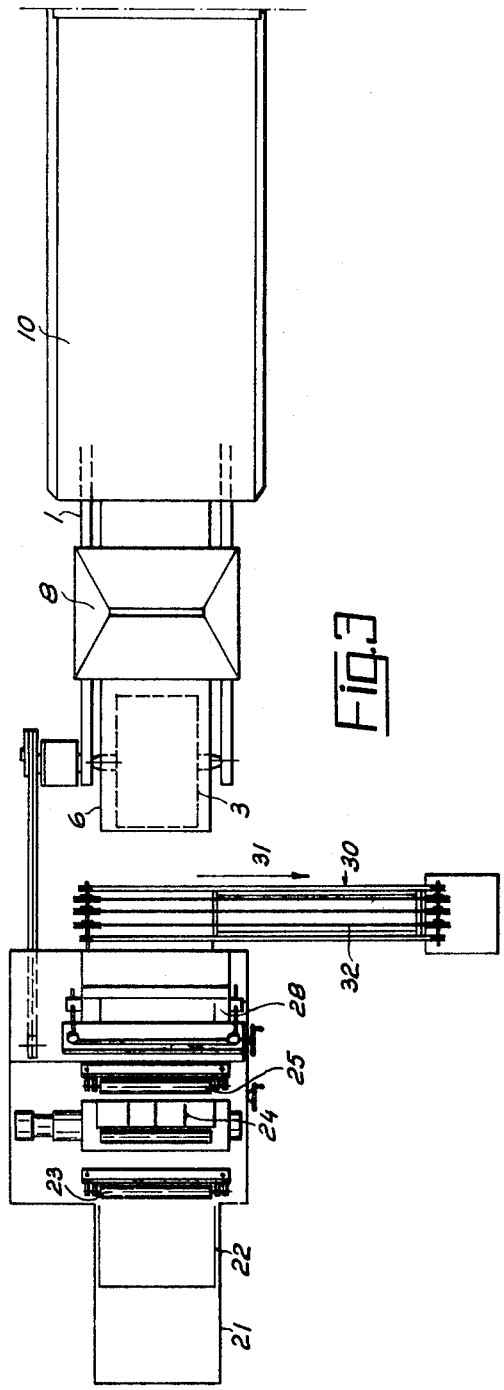

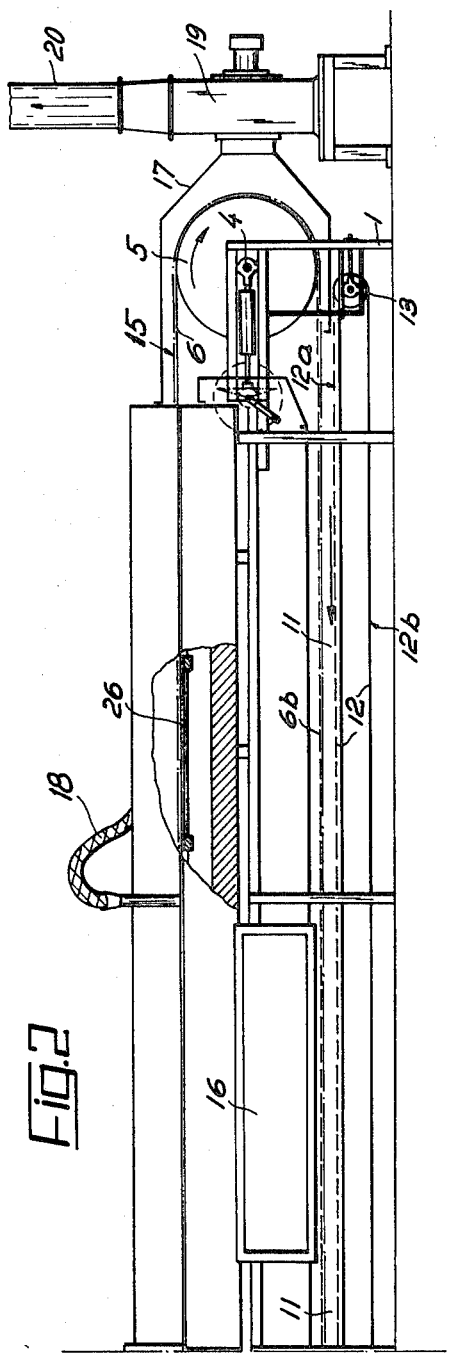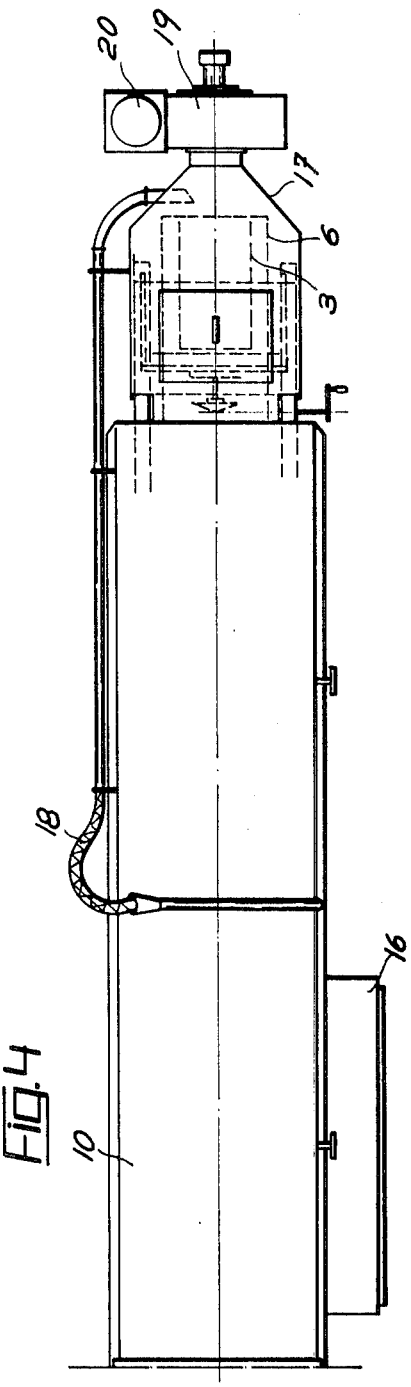

3,583,029
APPARATUS FOR THE CONTINUOUS PRODUCTION OF SINTERED PLASTICS POWDER PLATES
Richard Rabl, Vienna, Austria, assignor to Akkumulatorenfabrik Dr. Leopold Jungfer, Feistritz im Rosentale, Carinthia, Austria
Filed Aug. 18, 1969, Ser. No. 850,758
Claims priority, application Austria, Nov. 11, 1968,
A 10,970/68
Int. Cl. B29c *13/00, 13/04;* B29d *7/02*
U.S. Cl. 18—4     9 Claims

ABSTRACT OF THE DISCLOSURE

This invention relates to an apparatus for the continuous production of plates of sintered synthetic plastics powder, particularly separator plates for accumulators, in which the plastics powder is applied in a layer on the upper run of an endless rotating conveyor belt and the powder layer is led by means of this belt for the purpose of sintering through a continuous furnace and then introduced for the purpose of hardening into a cooling duct, and in which the sintered strip leaving the cooling duct is fed to cutting devices, which divide up the strip transversely and if requisite also longitudnially.

---

With known appliances of this kind there is located at one end of the endless rotating conveyor belt the feed hopper for the plastics powder and the application device by means of which a smooth or profiled layer of powder is applied on the conveyor belt. The conveyor belt then runs through the longitudinally-extending continuous furnace and following this a longitudinally-extending cooling duct in alignment with the continuous furnace. At the end of the cooling duct the already consolidated powder strip is taken off the conveyor belt and fed, a loop being formed, to a further conveyor section likewise aligned with the continuous furnace and the cooling duct, on which section are located the cutting devices which divide the sintered strip transversely and generally also longitudinally. The plastics plates obtained by this division are fed, after the cutting devices, on a conveyor track likewise aligned with the continuous furnace and the cooling duct, via a testing station to the removal point.

A disadvantage of this type of construction is that the aligned arrangement of the continuous furnace, the cooling zone and the following cutting and testing sections results in a very large overall length of the apparatus, which may be 25 metres and more which distances are frequently not available in workshops. A further disadvantage of this type of construction is caused by the fact that the critical stations of the apparatus, that is to say the powder application station and the cutting and testing station, lie at the two ends of the apparatus, that is to say at a considerable distance apart, and therefore each have to be attended by a separate operator.

One object of the present invention is to avoid the said disadvantages of the known type of construction, that is to say to reduce considerably the requisite overall length and at the same time make it possible for a single operator to operate the apparatus. This is effected in accordance with the invention by arranging the cooling duct below the continuous furnace and arranging for the return run of the endless conveyor belt to pass through it, the rear deflecting drum of the conveyor also serving to deflect the sintered strip towards the cooling duct, and the rear end of the cooling duct lying near the forward deflecting drum for the conveyor belt having adjacent to it a deflecting track for the sintered strip on which track the said strip is fed, a loop being formed and deflection through about 180° taking place to the inlet of at least one pair of conveyor rollers and to the cutting devices.

Owing to the return guiding of the cooling duct below the continuous furnace the overall constructional length of the apparatus can be considerably reduced and at the same time the advantage is obtained that the critical terminal stations (cutting and testing stations) of the apparaus, in respect of the path of through-travel of the sintered strip, come to lie in the vicinity of the starting station (powder application station), and therefore can easily be attended by a single operator.

As the sintered strip on the return run of the conveyor belt gradually becomes loose from this under its own weight, there advantageously travels through the cooling duct under the return run of the endless conveyor belt and in the same direction as this, the upper run of an endless support belt, which is driven at the same speed as the endless conveyor belt and which is capable of supporting the sintered strip becoming loosened from the conveyor belt.

At the exit from the cooling duct there is advantageously provided an upwardly curved guide surface for the outside of the loop formed by the sintered strip, while at the inlet of the pair of conveyor rollers which feed the sintered strip forward to the cutting devices a downwardly curved guide surface for the inside of this loop is provided.

In a preferred embodiment of the invention there is provided behind the cutting devices between the deflected conveying path of the sintered strip and the front deflecting drum of the endless conveyor belt transversely to the longitudinal axis of the apparatus a conveying track for the plates cut to length, the said conveying track containing a testing station, preferably taking the form of a transillumination or radioscopic examination device for the plates cut to length.

A specific embodiment of the invention will now be described by way of example with refeernce to the accompanying drawings, in which:

FIGS. 1 and 2 represent diagrammatically the left and right hand halves of an apparatus embodying the invention in side elevation, and FIGS. 3 and 4 are plan views of the elevations shown in FIGS. 1 and 2 respectively.

In the drawing there is shown a longitudinally extending machine frame 1, at whose front end there is supported in a bearing 2 a front driven deflecting drum 3 and at whose rear end there is supported in a bearing 4 a rear deflecting drum 5 for an endless conveying belt 6. Directly behind the front deflecting drum 3 is located a powder application station, constructed in known manner and diagrammatically indicated by a feed hopper 8 and application and support rollers 9. In this powder application station the upper run 6a of the conveyor belt 6 is coated with a plastics powder to be sintered. The powder layer carried by the conveyor belt 6 then travels through a longitudinally extending continuous furnace 10 supported by the machine frame 1. In this continuous furnace the plastics powder layer is heated to sintering temperature and sintered, so that it adheres to the conveyor belt 6, remaining adherent to the said conveyor belt during the deflection of the conveyor belt, on leaving the continuous furnace, around the rear deflecting drum 5, and is fed by the returning lower run 6b of the conveyor belt 6 into a cooling duct 11, which is provided underneath the continuous furnace 10 and whose outlet end 11a lies near the powder application station 7. It is clear that by the return arrangement of the cooling duct 11 underneath the continuous furnace 10 the length of the apparatus is considerably shortened.

As the sinter strip is consolidated on its travel through the cooling duct 11 and there is gradually released by by shrinkage from the return run 6b of the conveyor belt 6 and consequently might be damaged by impact against the lower wall of the cooling duct 11 the upper run 12a of an endless conveyor belt 12 is led through the cooling duct, and is guided, in front of and behind the cooling uct 11, round deflecting rollers 13 and 14 supported at the machine frame 1, the return run 12b extending underneath the cooling duct. The supporting belt 12 is, as will be explained later, driven in common with the conveyor belt 6 in such a way that in the cooling duct the lower run 6b of the conveyor belt 6 and the upper run 12a of the supporting belt 12 travel in the same direction and at the same speed, a gap being formed between them in which moves the sintered strip 15 either adhering to the lower run of the conveyor belt 6 or supported by the upper run of the support belt 12.

In the central portion of the continuous furnace are located switchgear and regulating gear 16 for the, preferably electrical, heating bodies 26 of the continuous furnace, which as a rule require attention only during the operation of the apparatus.

The rear deflecting drum 5 for the endless conveyor belt and the entry of the cooling duct 11 are surrounded by a housing 7 fluid tightly connecting them in common to the continuous furnace 10, and whose interior is connected with a suction fan 19, which produces a powerful flow of cooling air from the outlet 11a of the cooling duct 11 in counter-current to the direction of travel of the sintered strip through the cooling duct. There also open into this housing, suction pipes 18 exerting a suction action on the continuous furnace, so that fumes or vapour produced during the sintering are forced by the suction fan into a vent shaft 20.

In the outlet 11a of the cooling duct 11 the already consolidated sintered strip 15 is passed from the support belt 12 to a guide surface 21, which is curved upward at its end, and the sintered strip is fed, forming a loop 15a, to the inlet of a pair of conveyor rollers 23, in front of which a downwardly curved guide surface 22 is provided. The loop 15a of the sintered strip, the length of which varies during operation because of shrinkage, lies at its maximum dimension with its outer side against the guide surface 21 and at its minimum dimension with its inner side against the guide surface 22. The sintered strip 15 is fed by the driven pair of conveyor rollers 23 (only indicated diagrammatically) to longitudinal cutting devices 24, which divide the strip into a plurality of longitudinal components. These longitudinal components are fed via a further pair of conveyor rollers 25 to transverse cutting devices 28. In the vicinity of these transverse cutting devices the sintered strip is supported by a sloping plane surface 29, so that the plastics plates cut to length slide down this surface onto a conveyor track 30, which is provided between the cutting devices 28 and the front deflecting roller 3 of the conveyor belt 6 and, as can be seen from the plan view in FIG. 3, extends transversely to the longitudinal axis of the apparatus. The plates cut to length are moved in the direction of the arrow 31 along the conveyor path 30 laterally away from the appliance, there being preferably provided on this conveying path a transillumination device 32 (only indicated diagrammatically) for the plates cut to length.

The operator in charge of the powder application station 7, can therefore also supervise the correctness of the working of the cutting station and simultaneously check the plates cut to length travelling via the transillumination device 32 for any rejects.

In order to facilitate one-man operation of the apparatus, the other control and regulating members to be operated during the working of the apparatus, at its left end according to FIGS. 1 and 3, are also brought together. Thus for instance the annular position of the shaft of the front deflecting drum 3 is in known manner slightly adjustable for the purpose of adjusting the central travel of the conveyor belt 6 over the deflecting drums 3, 5.

A common drive motor 33 is provided for the front deflecting drum 3 of the endless conveyor belt 6, for the deflecting roller 14 adjacent to it of the endless support belt 12 and for the conveyor roller pairs 23, 25 in the deflected conveying path of the sintered strip, which motor ensures the drive of the said components via suitable intermediate transmission members, for example see belts, only partly and diagrammatically indicated in the drawing.

In the component 1a of the machine frame carrying the conveyor roller pairs 23, 25 and the cutting devices 24, 28, there is further provided a device for fine adjustment of the speed of rotation of the conveyor roller pairs 23, 25 in the deflected conveying path of the sintered strip, in relation to the drive speed of rotation of the two endless belts 6 and 12 for the purpose of regulating the length of the loop 15a. The operating members required for this purpose also lie within reach of the operator of the apparatus.

What I claim is:

1. Apparatus for the continuous production of sintered plastics powder plates, particularly separator plates for accumulators, in which the plastics powder is applied in a layer on the upper run of an endless rotating conveyor belt and the powder layer is led by means of this belt through a continuous furnace for sintering purposes and then introduced into a cooling duct for hardening, and in which the sintered strip leaving the cooling duct is fed to cutting devices which divide the strip in the transverse direction and if requisite also in the longitudinal direction, characterized in that the cooling duct is arranged underneath the continuous furnace and there passes through it the return run of the endless conveyor belt, the rear deflecting drum of the conveyor belt also serving for deflecting the sintered strip towards the cooling duct, and the end of the cooling duct lying near the front deflecting drum for the conveyor belt adjoining a deflecting path for the sintered strip, on which the sintered strip arrives, forming a loop and a deflection of about 180° taking place at the inlet of at least one pair of conveyor rollers and at the cutting devices.

2. Apparatus as claimed in claim 1, characterized in that the rear deflecting drum for the endless conveyor belt and the inlet of the cooling duct are enclosed by a common housing, whose interior is connected with a suction fan.

3. Apparatus as claimed in claim 1, characterized in that the upper run of an endless support belt extends through the cooling duct underneath the return run of the endless conveyor belt and in the same direction as this, and which is driven at the same speed as the endless conveyor belt.

4. Apparatus as claimed in claim 1, characterized in that there is provided at the outlet of the cooling duct an upwardly curved guide surface for the outside of the loop formed by the sintered strip and at the inlet of the conveyor roller pair a downwardly curved guide surface for the inside of this loop.

5. An apparatus as claimed in claim 1, characterized in that behind the cutting devices there is provided, between the deflected conveying path of the sintered strip and the front deflecting drum of the endless conveying belt a conveying path, arranged transversely to the longitudinal axis of the apparatus, for the plates cut to length, the said conveying path preferably comprising a transillumination device for the plates cut to length.

6. Apparatus as claimed in claim 1, characterized in that the axis of the front deflecting drum is angularly adjustable in the horizontal plane for the purpose of adjusting the central running of the conveyor belt over the deflecting drums.

7. Apparatus as claimed in claim 1, characterized in that a common drive motor is provided for the front deflecting drum of the endless conveyor belt for the deflecting roller, adjacent to it, of the endless support belt and for the pair of conveyor rollers in the deflected conveying path of the sintered strip.

8. Apparatus as claimed in claim 1, characterized in that a device for fine adjustment of the speed of rotation of the pair of conveyor rollers in relation to the drive speed of rotation of the two endless belts for the purpose of regulating the length of the loop, is provided in the deflected conveying path of the sintered strip.

9. Apparatus as claimed in claim 1, characterized in that all the regulating members for the drive of the apparatus are accommodated in a common machine frame on which the pair of conveyor rollers and the cutting device are mounted.

References Cited

UNITED STATES PATENTS

| | | | |
|---|---|---|---|
| 496,469 | 5/1893 | Wolff | 18—4 |
| 2,164,058 | 6/1939 | Fowler | 264—146 |
| 2,508,414 | 5/1950 | Meyer | 18—9X |
| 2,534,629 | 12/1950 | Schultze | 18—9X |
| 3,116,349 | 12/1963 | Immel | 18—4X |
| 3,200,439 | 8/1965 | Katz | 18—4X |

FOREIGN PATENTS 256,797   8/1926   Great Britain.

ANDREW R. JUHASZ, Primary Examiner

R. L. SPICER, Jr., Assistant Examiner

U.S. Cl. X.R.

18—5